W. HASLUP.

EARTH SCRAPER.

No. 10,045. Reissued Feb. 28, 1882.

Attest
Jno. L. Jones
Jno. E. Giles

Inventor
William Haslup
by Wood & Boyd
his Attorneys &c.

N. PETERS, Photo-Lithographer, Washington, D. C.

UNITED STATES PATENT OFFICE.

WILLIAM HASLUP, OF SIDNEY, OHIO.

EARTH-SCRAPER.

SPECIFICATION forming part of Reissued Letters Patent No. 10,045, dated February 28, 1882.

Original No. 234,982, dated November 30, 1880. Application for reissue filed November 7, 1881.

*To all whom it may concern:*

Be it known that I, WILLIAM HASLUP, of Sidney, in the county of Shelby and State of Ohio, have invented a new and Improved Earth-Scraper; and I do hereby declare that the following is a full, clear, and exact description of the same, reference being had to the accompanying drawings, forming part of this amended specification, in which—

Figure 1:
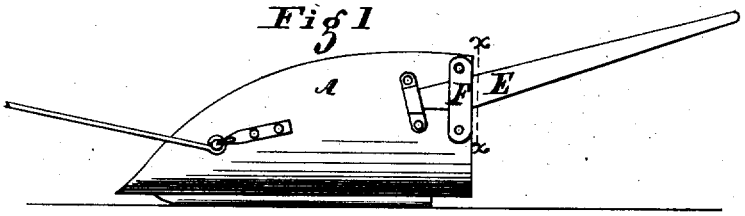
Figure 2:
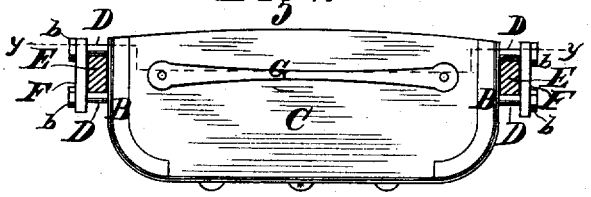
Figure 3:
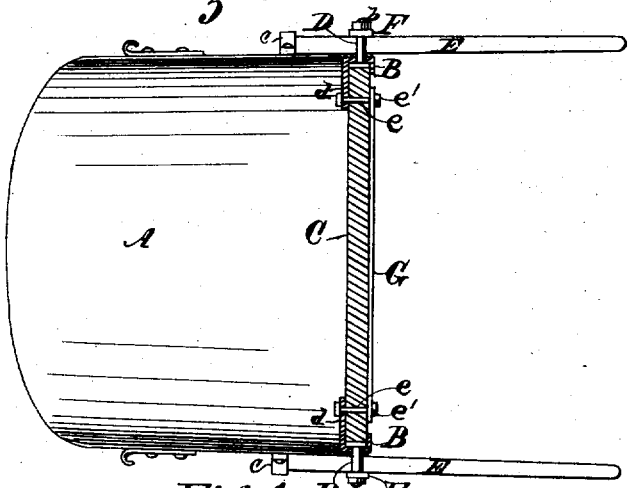
Figure 4:
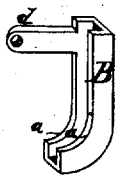

Figure 1 is a side elevation. Fig. 2 is a rear view with the handles in section on the line *x x* of Fig. 1. Fig. 3 is a plan view with the back board in section through the line *y y* of Fig. 2. Fig. 4 is a detail, in perspective, of one of the socket-plates.

My invention relates to an improvement in earth-scrapers.

It consists, first, in the means for attaching the back board to the sides and bottom of a bent sheet-metal scraper by providing stiffening socket-plates which form a support for the back, and at the same time, by the connection of the back therewith, hold the bent metal in its scoop form, with suitable provision for allowing the back board to be taken out and replaced without disturbing the adjustment of the handles.

My invention also consists in the combination, with the back board of the scraper, of socket-plates forming seats for the end portions of said back board, and means for confining the side walls of the scraper in proper position relative to the socket-plates and the back board.

My invention further consists in combining with the socket-plates and back board a brace-bar fastened to the back board by means of cross-bolts, said brace-bar serving to support the back board, and acting as washers to prevent abrasion and the working of the fastening-bolts.

In the drawings, A represents the body of the scraper, which is made of sheet-steel and turned up at the sides.

B B are socket-plates, which are curved on their outer edges to correspond with the curve of the side walls of the scraper, and they extend downward and inward a sufficient distance to hold the scoop in its proper form when they have been securely fastened in position on the back. They are provided with two flanges, *a a*, Fig. 4, which project inwardly and form sockets to receive the ends of the back board. *d d* represent lugs attached to one of the flanges *a a*, and they are pierced with bolt-holes.

*e e* represent cross-bolts which pass through the lugs *d d* and the back board, C, to clamp and hold the back board firmly to the sockets B B. In order to protect the wooden back board, a brace-bar, G, is used upon the ends of the bolts *e e* and under the nuts *e′ e′*, so as to form washers to prevent abrasion. This bar G being upon the side of the back board, C, opposite to the lugs *d d*, serves as a brace to support the back board against strains, and also prevents the bolts from working loose in the back board.

D D are two bolts, whose heads are arranged in the groove of the socket-plate near the top, and whose shanks extend through the socket-plate and the side walls of the scraper, and project on the outside a sufficient distance to receive the handles E between them, which handles are firmly held by a clamp-plate, F, whose perforated ends are slipped over the two bolts and the plate clamped against the handles by nuts *b b*. To insure stiffness in the handles, their forward ends are seated in sockets *c* rigidly fixed to the outer sides of the scraper. It will thus be seen that by the agency of the bolts and clamp-plate and socket-plate the handles and the intermediate wall of the scraper are firmly clamped together, but in such a manner as to permit these parts to be readily detached when desired. The socket-plates, with their flanges, also prevent the ends of the back board from splitting.

Having thus described my invention, what I claim as new is—

1. The combination, with the side walls of a scraper, of a pair of socket-plates arranged inside the walls of the scraper, and adapted to receive and support the back board, the bolts D D, clamp-plates F, and the handles, whereby the socket-plates, side walls, and handles are firmly clamped, substantially as described.

2. In a scraper, the combination, with the scraper-body and back board, of a pair of socket-plates embracing the ends of the back board and extending from the top to the bottom edges thereof to form complete sheaths to the same, against which the side walls of the scraper rest, and devices, substantially as described, for confining the side walls of the scraper-body in proper position.

3. The combination, with the scraper-body and back board, of the curved socket-plates embracing the ends of the said board and extending from the top downward around the curved edges thereof, and devices, such substantially as described, for confining the socket-plates on the ends of the back board and retaining the scraper-body in proper position.

4. The combination, with the bent walls of the scraper and the back board, C, of the socket-plates B, the transverse bar G, the cross-bolts *e*, and devices, such substantially as described, for confining the bent walls in proper position relative to the socket-plates and the back board.

WILLIAM HASLUP.

Witnesses:
G. A. MARSHALL,
CHAS. I. LEWIS.